May 6, 1969 N. GOLD 3,443,025
COLOR TELEVISION SYSTEM EMPLOYING SUPERIMPOSED RED AND WHITE IMAGES
Filed Feb. 4, 1966
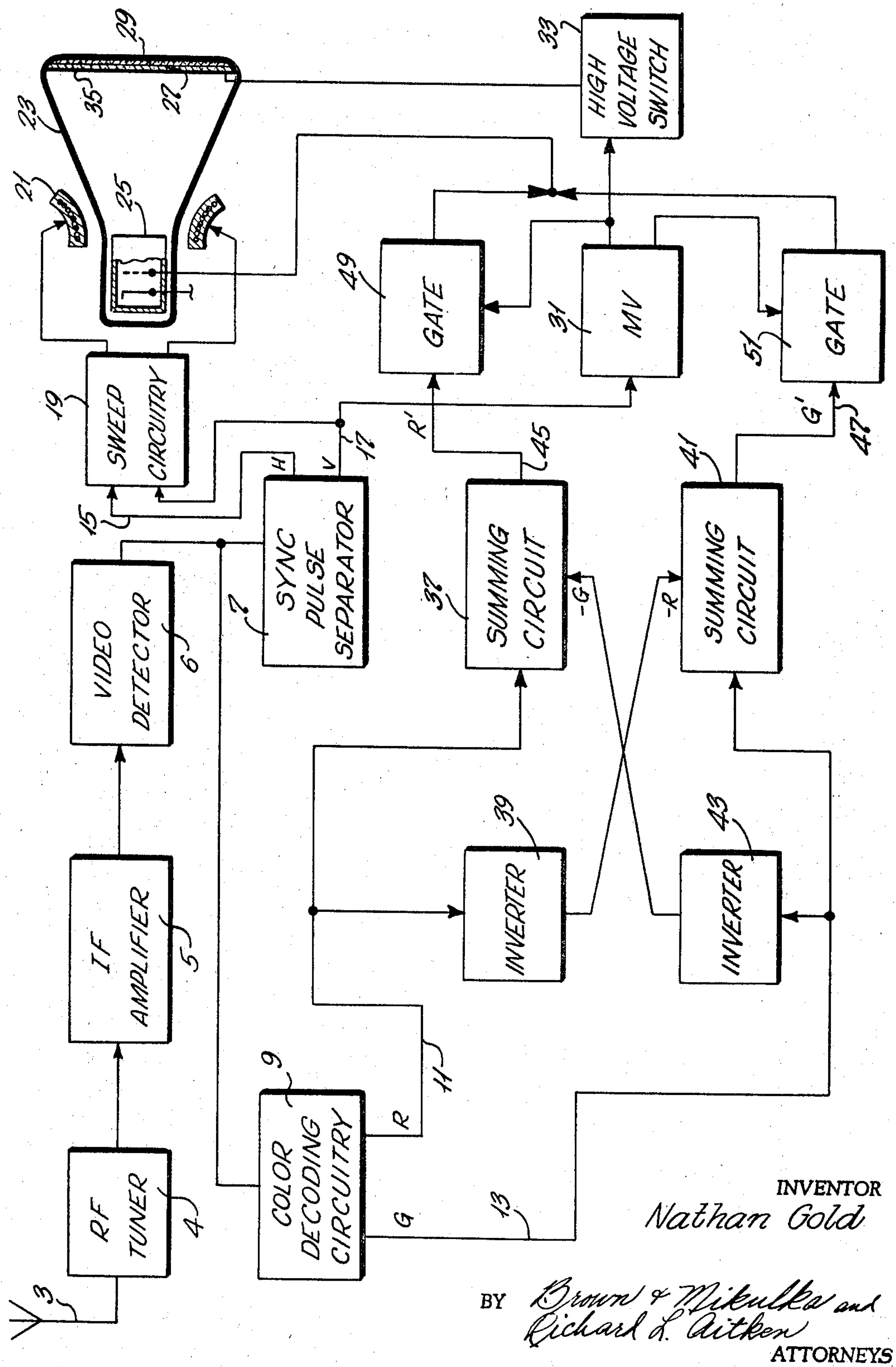
INVENTOR
Nathan Gold
BY Brown & Mikulka and Richard L. Aitken
ATTORNEYS United States Patent Office 3,443,025

Patented May 6, 1969

3,443,025

COLOR TELEVISION SYSTEM EMPLOYING SUPERIMPOSED RED AND WHITE IMAGES

Nathan Gold, Brookline, Mass., assignor to Polaroid Corporation, Cambridge, Mass., a corporation of Delaware Filed Feb. 4, 1966, Ser. No. 525,202
Int. Cl. H04n *5/38, 5/49, 9/02*
U.S. Cl. 178—5.4 13 Claims

ABSTRACT OF THE DISCLOSURE

This specification discloses a color television system which produces a full color image of the televised scene by superimposed red and white images. The red image is produced in accordance with a modified red video signal obtained by adding a small amount of inverted green video to the red video. The white image is produced in accordance with a modified green video signal which is obtained by adding a small amount of inverted red video to the green video.

This invention relates to color television and more particularly to an improved color television system of the type which produces images in red and white light, which images combine to be perceived as a multicolored image.

It has been discovered that a multicolored scene as perceived by a viewer can be produced by superimposing red and white images of the same scene. The red image is made in accordance with the relatively long wavelength light in the scene and the white image is made in accordance with the relatively short wavelength light in the scene. For example, a full color representation as perceived by a viewer of a multicolored scene can be produced as follows. The scene is photographed through a red filter to provide a black and white positive referred to as the "long record" and is photographed through a green filter to provide a black and white positive referred to as the "short record." Red light is then projected through the long record to provide an image of the scene in red light and white light is projected through the short record to provide an image of the scene in white light superimposed upon the image of the scene in red light. The resulting combination of superimposed images will be perceived by the viewer in full color.

This phenomenon of color perception, which is fully described in an article entitled, "The Retinex," by Edwin H. Land in the June 1964 issue of American Scientist, pages 247–264, can be used to advantage in color television. A color television system which employs this phenomenon is described in the copending application Ser. No. 297,341 filed July 24, 1963, and owned by the assignee of this application, now Patent No. 3,290,434. In such a color television system the normal approach is to produce superimposed images on the screen of the picture tube in red and white light. The image in red light is controlled in accordance with red video and the image in white light is controlled in accordance with green video. The superimposed images will then combine to produce a multicolored image as perceived by the viewer.

The present invention is based on the discovery that the color quality in the multicolored image perceived by the viewer can be substantially improved if a small amount of inverted green video is added to the red video to produce a modified red video and a small amount of inverted red video is added to the green video to produce a modified green video. The image in red light is then produced in accordance with the modified red video and the image in white light is produced in accordance with the modified green video. The color quality in the resulting multicolored image as perceived by the viewer will then be substantially improved.

Accordingly an object of the present invention is to provide an improved color television system.

Another object of the present invention is to improve the color quality in the image perceived by the viewer in a color television system of the type in which superimposed red and white images are produced to be perceived by the viewer as a multicolored image.

A further object of the present invention is to provide an improved color television system of the type in which superimposed red and white images are produced to be perceived by the viewer as a multicolored image.

Further objects and advantages of the present invention will become readily apparent as the following detailed description of the invention unfolds and when taken in conjunction with the single figure of the drawings which is a block diagram of a television receiver constructed in accordance with the present invention.

As shown in the single figure of the drawings the receiver of the present invention comprises an antenna 3 which intercepts the RF color television signal and applies it to an RF tuner 4. The RF color television signal includes an RF picture wave which is amplitude modulated with a composite color video signal representing a multicolored scene, including a luminance signal and a color subcarrier amplitude and phase modulated with the color information, in accordance with present broadcasting standards. The RF signal also includes sound information which is detected in a conventional manner, but which will not be described in the present application for purposes of simplification. The RF tuner converts the intercepted RF color television signal to IF and applies it to an IF amplifier 5, which amplifies the applied signal and applies it to a video detector 6. The video detector 6 converts the applied IF signal to the composite color video signal and applies the composite video signal to a sync pulse separator 7 and to color decoding circuitry 9. In response to the composite color video signal the color decoding circuitry 9 produces a red video signal on a channel 11 and a green video signal on a channel 13. The red video signal represents the red light in the televised scene and the green video represents the green light in the televised scene. The sync pulse separator 7 separates out the horizontal and vertical sync pulses from the applied composite video signal and produces the horizontal sync pulses on a channel 15 and the vertical sync pulses on a channel 17.

The horizontal and vertical sync pulses are applied to sweep circuitry 19, which applies current waveforms to deflection coils 21 of a color television picture tube 23 to cause the electron beam produced within the picture tube 23 to sweep the screen of the picture tube in a conventional manner. The picture tube 23 is provided with an electron gun 25 which produces an electron beam acted on by the horizontal and vertical deflection coils 21. The picture tube 23 is also provided with a laminated phosphor screen comprising an inner layer of phosphor 27 nearer the electron gun and an outer layer of phosphor 29. The inner layer of phosphor 27 produces red light when excited by an impinging electron and the outer layer of phosphor 29 produces mixed blue and green light when excited by an impinging electron.

The electron beam produced by the electron gun 25 is accelerated to a velocity corresponding to 10 kilovolts or to a velocity corresponding to 15 kilovolts.. When the electron beam is accelerated to a velocity corresponding to 10 kilovolts, it will penetrate only into the inner layer 27 so that only the inner layer is excited and gives off red light. When the electron beam is accelerated to a velocity corresponding to 15 kilovolts, the electrons will have enough energy to penetrate through the inner layer 27 and into the outer layer 29 so that both the layers 27 and 29 are excited and give off their characteristic light. Accordingly, white light will be emitted from the screen when the electron beam is accelerated to a velocity corresponding to 15 kilovolts.

The deflection field in the picture tube will have a greater effect on lower velocity electrons than on higher velocity electrons. Since the electrons are accelerated to different velocities to produce red and white light, some means must be provided to compensate or avoid this difference in the effect of the deflection field. This means may for example be the same as that provided in the above mentioned copending application Ser. No. 297,341, now Patent No. 3,290,434.

The vertical sync pulses produced on channel 17 are applied to a multivibrator 31 which produces an output square wave at half the frequency of the applied vertical sync pulses and applies this square wave to a high voltage switch 33. The high voltage switch 33 alternately applies 10 and 15 kilovolts to an aluminum film 35 overlying the layers of phosphor 27 and 29. The switching between 10 and 15 kilovolts is carried out in synchronism with the applied square wave so that the electron beam first scans the entire field on the screen with 15 kilovolts applied to the aluminum film 35 and then scans the entire field with 10 kilovolts applied to the aluminum film. As a result the velocity of the electron beam will alternate between 10 and 15 kilovolts in successive scannings of the field.

The red video on channel 11 is applied to a summing circuit 37 and to an inverter 39. The green video signal on channel 13 is applied to a summing circuit 41 and to an inverter 43. The inverter 43 inverts the applied green video signal and applies it to the summing circuit 37, which adds a small portion of the applied inverted green video to the applied red video signal to produce a modified red video signal on a channel 45. The inverter 39 inverts the applied red video signal and applies it to the summing circuit 41, which adds a small portion of the applied inverted red video signal to the green video signal to produce a modified green video signal on a channel 47. The ratio of the inverted red video signal added to the green video signal and the ratio of the inverted green video signal added to the red video signal in the summing circuits 37 and 41 in the preferred embodiment is one part in ten. The modified red video signal produced on channel 45 is applied to a gate 49 and the modified green video signal produced on channel 47 is applied to a gate 51. The multivibrator 31 alternately enables the gates 49 and 51 on successive scannings of the field by the electron beam so that the gate 49 is enabled when 10 kilovolts are applied to the aluminum film 35 and the gate 51 is enabled when 15 kilovolts are applied to the aluminum film 35. The outputs of the gates 49 and 51 are applied to the control grid of the electron gun 25. Accordingly, when 15 kilovolts are applied to the aluminum film 35, the modified green video signal will be applied to the control grid of the electron gun 25 so that an image will be produced on the screen of the picture tube in white light in accordance with the modified green video signal; and when 10 kilovolts are applied to the aluminum film 35, the modified red video signal will be applied to the control grid of the electron gun so that an image in red light will be produced on the screen of the picture tube in accordance with the modified red video signal. The red and white images will then combine to be perceived by the viewer as a multicolored image as represented by the composite video signal. Because the superimposed images are produced from red and green video signals which have been modified by adding small amounts of inverted green and red video signals respectively, the quality of the color in the image as perceived by the viewer is substantially improved.

Instead of using separate summing circuits and inverters, the addition of the small portion of inverted red video to the green video and the small portion of inverted green video to red video can be carried out in the matrix of the color decoding circuitry. In the matrix the red and green video signals are produced by adding together various proportions of the luminance signal and the color information signals, which are referred to as I and Q signals. Alternatively the same result can be closely approximated by increasing the amplitude of the detected color subcarrier relative to the luminance signal. Then when the red and green video are produced by combining the luminance signal in the proper proportions with the I and Q signals or by adding the luminance signal to the color difference signals, a close approximation of the addition of the small portion of inverted green video to the red video and vice versa occurs automatically. These and many other modifications may be made to the above described specific embodiment of the invention without departing from the spirit and scope of the invention, which is defined in the appended claims.

What is claimed is:

1. A color television display system comprising means to present a color television signal including a first video signal representing relatively long wave length light in a televised scene and a second video signal representing relatively short wave length light in said scene, and means responsive to said color television signal to produce superimposed images of said scene in red and white light, said means responsive to said color television signal including means for controlling the image in red light with a third modified video signal comprising said first video signal with a relatively small inverted portion of said second video signal added thereto and means for controlling said image in white light with a fourth modified video signal comprising said second video signal with a relatively small inverted portion of said first video signal added thereto.

2. A color television display system as recited in claim 1 wherein siad first video signal comprises the red video signal representing said televised scene and said second video signal comprises the green video signal representing said televised scene.

3. A color television display system as recited in claim 1 wherein the proportion of the small inverted portions of said second and first video signals added to said first and second video signals respectively to produce said third and fourth modified video signals is on the order of one part in ten.

4. A color television display system as recited in claim 1 wherein said means to produce said superimposed images in red and white light comprises a color television picture tube operable to produce an image in red light in accordance wtih an applied video signal and operable to produc an image in white light superimposed upon said image in red light in accordance with an applied video signal.

5. A method of producing a color television display of a scene comprising generating a first video signal representing the relatively long wave length light in said scene, generating a second video signal representing the relatively short wave length light in said scene, adding a relatively small inverted portion of said second video signal to said first video signal to produce a third modified video signal, adding a relatively small inverted portion of said first video signal to said second video signal to produce a fourth modified video signal, producing an image in red light in accordance with said third modified video signal, and producing an image in white light superimposed upon said image in red light in accordance with said fourth modified video signal.

6. A method of producing a color television display as recited in claim 5 wherein said first video signal is a red video signal representing the red light in said scene and said second video signal is a green video signal representing the green light in said scene.

7. A method of producing a color television display as recited in claim 5 wherein the proportion of the relatively small inverted portions of said second and first video signals added to said first and second video signals respectively to produce said third and fourth modified video signals is on the order of one part in ten.

8. A method of producing a color television display of a scene comprising the steps of producing an image in white light in accordance with a modified video signal comprising a first video signal representing the relatively long wave length light in said scene added to a relatively small inverted portion of a second video signal representing the relatively short wave length light in said scene, and producing an image in white light superimposed on said image in red light in accordance with a modified video signal comprising said second video signal added to a relatively small inverted portion of said first video signal.

9. A method of producing a color television display as recited in claim 8 wherein said first video signal is a red video signal representing the red light in said scene and said second video signal is a green video signal representing the green light in said scene.

10. A method of producing a color television display as recited in claim 8 wherein the proportion of the small inverted portions of said second and first video signals added to said first and second video signals to produce said modified video signals is on the order of one part in ten.

11. A color television display system comprising a color television picture tube operable to produce superimposed images in red and white light, means of having first and second video inputs and operable to control said picture tube to produce an image in red light in accordance with a video signal applied to said first input and to control said picture tube to produce an image in white light superimposed upon said image in red light in accordance with a video signal applied to a second input, and means to apply to said first input a modified video signal comprising a first video signal representing the relatively long wave length light in a televised scene plus a relatively small inverted portion of a second video signal representing the relatively short wave length light in said scene and to apply to said second input a modified video signal comprising said second video signal plus a relatively small inverted portion of said first video signal.

12. A color television display system as recited in claim 11 wherein said first video signal comprises a red video signal representing said televised scene and said second video signal comprises a green video signal representing said televised scene.

13. A color television display system as recited in claim 11 wherein the proportion of the small inverted portions of said second and first video signals added to said first and second video signals to comprise said modified video signals is on the order of one part in ten.

References Cited

UNITED STATES PATENTS

| | | | |
|---|---|---|---|
| 3,003,391 | 10/1961 | Land | 178—5.4 |
| 3,290,434 | 12/1966 | Cooper et al. | 178—5.4 |
| 2,864,951 | 12/1958 | Loughlin | 178—5.4 |

ROBERT L. GRIFFIN, *Primary Examiner.*

J. MARTIN, *Assistant Examiner.*

U.S. Cl. X.R.

178—5.2